(12) United States Patent
Healey (10) Patent No.: US 12,377,468 B2
(45) Date of Patent: Aug. 5, 2025

(54) COUPLING SYSTEM FOR AN ADDITIVE MANUFACTURING PROCESS

(71) Applicant: LPW TECHNOLOGY LTD, Widnes (GB)

(72) Inventor: Callum Healey, Liverpool (GB)

(73) Assignee: LPW TECHNOLOGY LTD, Widnes (GB)

( * ) Notice: Subject to any disclaimer, the term of this patent is extended or adjusted under 35 U.S.C. 154(b) by 181 days.

(21) Appl. No.: 17/787,200

(22) PCT Filed: Dec. 16, 2020

(86) PCT No.: PCT/GB2020/053254
§ 371 (c)(1),
(2) Date: Jun. 17, 2022

(87) PCT Pub. No.: WO2021/123782
PCT Pub. Date: Jun. 24, 2021

(65) Prior Publication Data
US 2023/0023850 A1    Jan. 26, 2023

(30) Foreign Application Priority Data
Dec. 17, 2019    (GB) ..................... 1918591

(51) Int. Cl.
*B33Y 30/00*    (2015.01)
*B22F 12/52*    (2021.01)

(52) U.S. Cl.
CPC ............ *B22F 12/52* (2021.01); *B33Y 30/00* (2014.12)

(58) Field of Classification Search
None
See application file for complete search history.

(56) References Cited

U.S. PATENT DOCUMENTS

2013/0333798 A1    12/2013  Bosveld
2015/0290861 A1*   10/2015  Douglass ............... B33Y 30/00
                                                       425/170

(Continued)

FOREIGN PATENT DOCUMENTS

CN    206766778 U    12/2017
CN    207630531 U    7/2018

(Continued)

OTHER PUBLICATIONS

Patent Cooperation Treaty: International Search Report and Written opinion for PCT/GB2020/053254 dated Feb. 24, 2021; 13 pages.

*Primary Examiner* — Mohammad M Ameen
(74) *Attorney, Agent, or Firm* — Schwabe, Williamson & Wyatt, P.C.

(57) ABSTRACT

The present invention relates to a coupling system for an additive manufacturing process, comprising: a conduit for the transfer of material between a container and a further component of the additive manufacturing process; and one or more actuators for controlling operation of the conduit; wherein the conduit comprises first and second portions connected via an extendable intermediate portion; and wherein the one or more actuators are operable to act on at least a portion of the conduit to extend or retract the intermediate portion to control the length of the conduit.

21 Claims, 8 Drawing Sheets

(56) References Cited

U.S. PATENT DOCUMENTS

2016/0107232 A1  4/2016  Okazaki
2018/0015673 A1* 1/2018  Lee ..................... B29C 64/393

FOREIGN PATENT DOCUMENTS

| | | |
|---|---|---|
| CN | 110842201 A | 2/2020 |
| EP | 3238922 A1 | 1/2017 |
| WO | 2019/005042 A1 | 1/2019 |

* cited by examiner

COUPLING SYSTEM FOR AN ADDITIVE MANUFACTURING PROCESS

CROSS-REFERENCE TO RELATED APPLICATION

The present application is a national phase entry under 35 U.S.C. § 371 of International Application No. PCT/GB2020/053254, filed Dec. 16, 2020, which designates the United States of America, which claims priority to GB Application No. 1918591.7, filed Dec. 17, 2019, the entire disclosures of each of these applications are hereby incorporated by reference in their entireties and for all purposes.

TECHNICAL FIELD OF THE INVENTION

The present invention relates to a docking arrangement, and specifically to a docking arrangement for use in an additive manufacturing process for supplying material such as powders held within containers (e.g. hoppers) to additive manufacturing machines.

BACKGROUND TO THE INVENTION

Additive manufacturing generally relates to the process of manufacturing 3D objects by building up layers of a material or materials. Conventionally, the materials may be supplied to additive manufacturing machines in the form of powders (e.g. metal powders). For small scale manufacturing processes the powders may be supplied in containers (e.g. plastic jars). For larger scale processes, hoppers have been designed for transporting large amounts of powder for delivery to additive manufacturing machines.

There is therefore a need for a docking arrangement where a hopper containing a material (e.g. a powder) for a manufacturing process may be docked and coupled to a component of an additive manufacturing process (e.g. an additive manufacturing machine) for delivering the powder from the hopper to the component. However, in some instances the size and weight of the hopper may be significant, making the docking and coupling processes difficult to complete quickly and effectively. In addition, there is a need to minimise the risk of damaging components, for example, due to incorrect alignment or collisions during the docking and coupling processes.

It would therefore be advantageous to provide a coupling system for an additive manufacturing process which aids in the coupling of a hopper to an inlet of a further component of the manufacturing process.

It is therefore an aim of an embodiment or embodiments of the invention to overcome or at least partially mitigate one or more problems associated with the prior art.

SUMMARY OF THE INVENTION

According to an aspect of the invention there is provided a coupling system for an additive manufacturing process, comprising: a conduit for the transfer of material between a container and a further component of the additive manufacturing process; and one or more actuators for controlling operation of the conduit; wherein the conduit comprises first and second portions connected via an extendable intermediate portion; and wherein the one or more actuators are operable to act on at least a portion of the conduit to extend or retract the intermediate portion to control the length of the conduit.

Advantageously, the coupling system allows for the container and the further component of the additive manufacturing process to be coupled without the need to move the entire container or further component during the final coupling step(s). Rather, the container and the further component (or inlet for the further component) may be brought proximal to one another before the coupling system is then used to more easily control the distance between the outlet of the container and the inlet for the further component during the final coupling step(s). In this way, the risk of damaging components of the manufacturing process due to incorrect alignment or collisions during the coupling process may be reduced.

In some embodiments the intermediate portion comprises a flexible material. The intermediate portion may comprise a resilient material. For example, in such embodiments the intermediate portion may be formed of a material which may be stretched and/or deformed such that it may be extended (or retracted) under operation of the one or more actuators. Advantageously, providing an intermediate portion formed of a flexible material may allow for relative movement of the first and second portions of the conduit in a plane perpendicular to direction of extension (or retraction) of the conduit. This may, for example, assist with minor corrections in the alignment of the outlet of the container and inlet for the further component, in use—e.g. during a coupling process.

In other embodiments, the intermediate portion may comprise a rigid material. For example, in such embodiments the intermediate portion may be configured in a folded or concertinaed arrangement such that it may be extended (or retracted) linearly under the operation of the one or more actuators.

The intermediate portion may be formed of a metal material, or a plastics material, for example. The intermediate portion may be formed of a rubber material, which may comprise a silicone rubber material, for example.

The intermediate portion may be substantially cylindrical. In embodiments, the intermediate portion may be substantially conical. The configuration of the intermediate portion may be chosen such that the intermediate portion is free from any crevices or folds in which material may be otherwise caught, in use. The intermediate portion may comprise one or more aberrations along its length. The one or more aberrations may be provided to encourage a reliable and repeatable collapse of the intermediate portion upon retraction of the conduit.

In embodiments the conduit comprises an outlet of the container. For example, in such embodiments the first portion of the conduit may be fixedly connected to or integrally formed with the container, with the second portion of the conduit comprising an interface for coupling the outlet of the container to the inlet for the further component of the additive manufacturing process. In use, the conduit, as a result of an extension of the intermediate portion, may be configured to extend outwardly from the container. The conduit may be configured to extend under the operation of the one or more actuators. For example, in embodiments where the coupling system is configured for use in a gravity fed arrangement (with the container provided above the inlet for the further component) the conduit may be configured to extend substantially downwards under the operation of the one or more actuators. In alternative embodiments, the conduit may be configured to extend substantially downwards under gravity and is operable to be retracted (e.g. pulled upwards) under operation of the one or more actuators.

In embodiments the conduit comprises an inlet for the further component of the additive manufacturing process. For example, in such embodiments the first portion of the conduit may be fixedly connected to or integrally formed with the further component (directly or indirectly via a further conduit), with the second portion of the conduit comprising an interface for coupling the inlet for the further component to the outlet of the container. In use, the conduit, as a result of an extension of the intermediate member, may be configured to extend outwardly from the inlet. The conduit may be configured to extend under the operation of the one or more actuators. For example, in embodiments where the coupling system is configured for use in a gravity fed arrangement (with the container provided above the inlet for the further component) the conduit may be configured to extend substantially upwards under the operation of the one or more actuators. In alternative embodiments, the conduit may be configured such to extend substantially upwards, for example under the operation of one or more biasing members, and is operable to be retracted (e.g. pulled downwards) under operation of the one or more actuators.

The coupling system may comprise one or more biasing members. For example, in some embodiments, the coupling system may comprise a plurality of biasing members.

The one or more biasing members may be configured to provide a bias which, in use, acts with the extension of the intermediate portion. In such embodiments, the one or more actuators may control the length of the conduit by restricting the extent to which the intermediate portion may be extended under operation of the one or more biasing members. In other embodiments, the one or more biasing members may be configured to provide a bias which, in use, acts against extension of the intermediate portion. In such embodiments, the intermediate portion may be retained in a retracted position unless acted on by the one or more actuators.

The one or more biasing members may comprise a resilient member, e.g. a compressible resilient member. In embodiments, the one or more biasing members may comprise a spring. In some embodiments the biasing member may comprise a gas spring.

The one or more actuators may be coupled to a portion of the conduit, e.g. to the first portion, second portion or intermediate portion of the conduit, via one or more connectors. In embodiments, the one or more connectors may be configured such that the portion may be able to move with respect to the one or more actuators. This configuration may allow for minor relative movements of the portions of the conduit without requiring operation of the or each actuator.

When used herein and throughout the specification, the phrase "minor relative movements of the portions of the conduit" is intended to cover relative movement of the various components of the conduit which are smaller in distance than the extent to which the intermediate portion may extend or retract under the operation of the one or more actuators. For example, this may include movements which are no more than 20%, or no more than 10%, or no more than 5% of the extent to which the intermediate portion may extend/retract under the operation of the one or more actuators.

Advantageously, configuring the coupling system in this manner allows for forces experienced by the system (e.g. through collisions between the outlet and the inlet during the coupling process, or through movement of the outlet and/or inlet to, for instance, align the outlet and inlet for coupling) to be substantially absorbed through minor relative movement of the components of the conduit rather than those forces being transferred to further components of the process—e.g. to the container or the further component. In this way, the likelihood of such forces causing malfunction of the coupling system or components of the manufacturing process as a whole may be reduced. In embodiments wherein the coupling system comprises one or more biasing members, at least part of such forces may be absorbed by the biasing member(s) further reducing transfer of such forces to the components of the manufacturing process.

The coupling system may be configured such that one or more actuators do not act on the conduit (e.g. do not act to move or retain the conduit at a given length) when the intermediate portion is in an extended position. The extended position of the intermediate portion may correspond to a coupling configuration of the coupling system. For example, with the intermediate portion in an extended position the one or more connectors may disengage or become slack, with the conduit instead being retained at an extended length under gravity and/or under operation of one or more biasing members, only. The one or more actuators may be deactivated or not energised in such a configuration. In this way, there may be no weight or force transfer to the conduit from the one or more actuators. In some instances it may be beneficial to provide one or more sensors (e.g. weight sensors) within the coupling system and/or at the inlet for the further component operable to measure the mass of the container. This may be useful to monitor the amount of material left in the container. Advantageously, configuring the coupling system such that the one or more actuators do not act on the conduit in certain configurations (e.g. when the outlet and inlet are coupled) prevents or at least reduces the likelihood of a false reading from such sensors.

In some embodiments the coupling system comprises a single actuator. In other embodiments, the coupling system comprises a plurality of actuators, e.g. two actuators.

In embodiments, the one or more actuators may comprise a linear actuator, which may, in embodiments, be a piston. Advantageously, using a linear actuator such as a piston allows for a relatively large force to be generated at a relatively low resource cost.

The or each piston may be controlled pneumatically or hydraulically through the introduction and/or removal of a fluid from within an associated piston chamber. In embodiments, introduction of a fluid into the piston chamber will cause an associated piston to move to cause the intermediate portion to extend, thereby increasing the length of the conduit. Similarly, removal of the fluid from within the piston chamber may cause the associated piston to move to cause the intermediate portion to retract, thereby decreasing the length of the conduit.

In alternative embodiments the one or more actuators may comprise an electric actuator such as a solenoid or motor.

In embodiments, the one or more actuators may be configured such that its operation may be isolated. In some embodiments the operation of the one or more actuators may be isolated such that the conduit may be retained at a given length, as required. In embodiments this may comprise a fully extended length or a fully retracted length, for example.

In some embodiments operation of the one or more actuators may be controllable via a control system. For example, in embodiments a control system may be provided for controlling movement of the one or more actuators.

The coupling system may include a locking mechanism. In use, the locking mechanism may be configured to hold the outlet of the container and the inlet for the component of the additive manufacturing process in a coupled state. The locking mechanism may include one or more locking members, which may be moveable in use between at least a first position and a second position under the operation of one or more locking actuators. The one or more locking members may be configured to engage an exterior surface of the outlet of the container when in said second position.

The one or more locking members may comprise a roller. Alternatively, the one or more locking members may comprise a cam.

The first and second positions may be first and second longitudinal positions. In further embodiments the first and second positions may be first and second rotational positions.

In embodiments, the locking mechanism may be provided within a recess defined by an open end of the inlet—e.g. an open upper end of the inlet corresponding to the second portion of the conduit. In such embodiments, the locking mechanism may be positioned such that it may act on an external surface of the outlet when the outlet is received within the recess defined by the open end of the inlet.

In embodiments, the locking mechanism may comprise two (or more) locking members. In some embodiments the locking mechanism comprises a pair of opposing locking members. In such embodiments the pair of opposing locking members may be configured to engage opposing external surfaces of the outlet of the container.

In embodiments, the one or more locking members may be configured to be received within a groove within the external surface of the outlet of the container. For example, in some embodiments the one or more locking members may be configured to have a complementary shape to a groove provided in the external surface of the outlet. In embodiments comprising more than one locking member, each of the locking members may correspond to respective groove sections on the external surface of the outlet. In other embodiments, the one or more locking members may be configured to be received within a groove provided about the entire circumference of the outlet. In such embodiments, this may allow the outlet of the container to be coupled to the inlet of the component without requiring precise rotational alignment of the outlet with the inlet.

In embodiments the container may comprise a hopper.

According to an aspect of the invention there is provided a container for an additive manufacturing process, the container comprising an outlet for dispensing material held within the container to a further component of the additive manufacturing process, and wherein the outlet comprises the coupling system of the first aspect of the invention.

The coupling system may be configured, in use, to couple the outlet of the container to an inlet for the further component of the additive manufacturing process.

According to a further aspect of the invention there is provided a component forming part of an additive manufacturing process, the component comprising an inlet, and wherein the inlet comprises the coupling system of the first aspect of the invention.

The coupling system may be configured, in use, to couple the inlet to an outlet of a container for dispensing material held within the container to the component.

According to a further aspect of the invention there is provided a docking arrangement for an additive manufacturing process, the docking arrangement comprising: a dock associated with an inlet for a component of the additive manufacturing process; a container comprising an outlet; and a coupling system of the first aspect of the invention for coupling the outlet of the container to the inlet for the component of the additive manufacturing process.

According to a further aspect of the invention there is provided a method of coupling an outlet of a container to an inlet for a further component of an additive manufacturing process using a coupling system of the first aspect of the invention, the method comprising: positioning the outlet of the container and the inlet for the further component proximal to one another; using the actuator of the coupling system to control the length of the conduit to bring the outlet and inlet into a coupling position; and coupling the outlet to the inlet.

Optionally, the method may comprise using one or more locking members to retain the coupling between the outlet of the container and the inlet for the component of the additive manufacturing process.

DETAILED DESCRIPTION OF THE INVENTION

In order that the invention may be more clearly understood one or more embodiments thereof will now be described, by way of example only, with reference to the accompanying drawings, of which.

The present invention relates to a docking arrangement 10 for a manufacturing process such as an additive manufacturing process.

Figure 1:
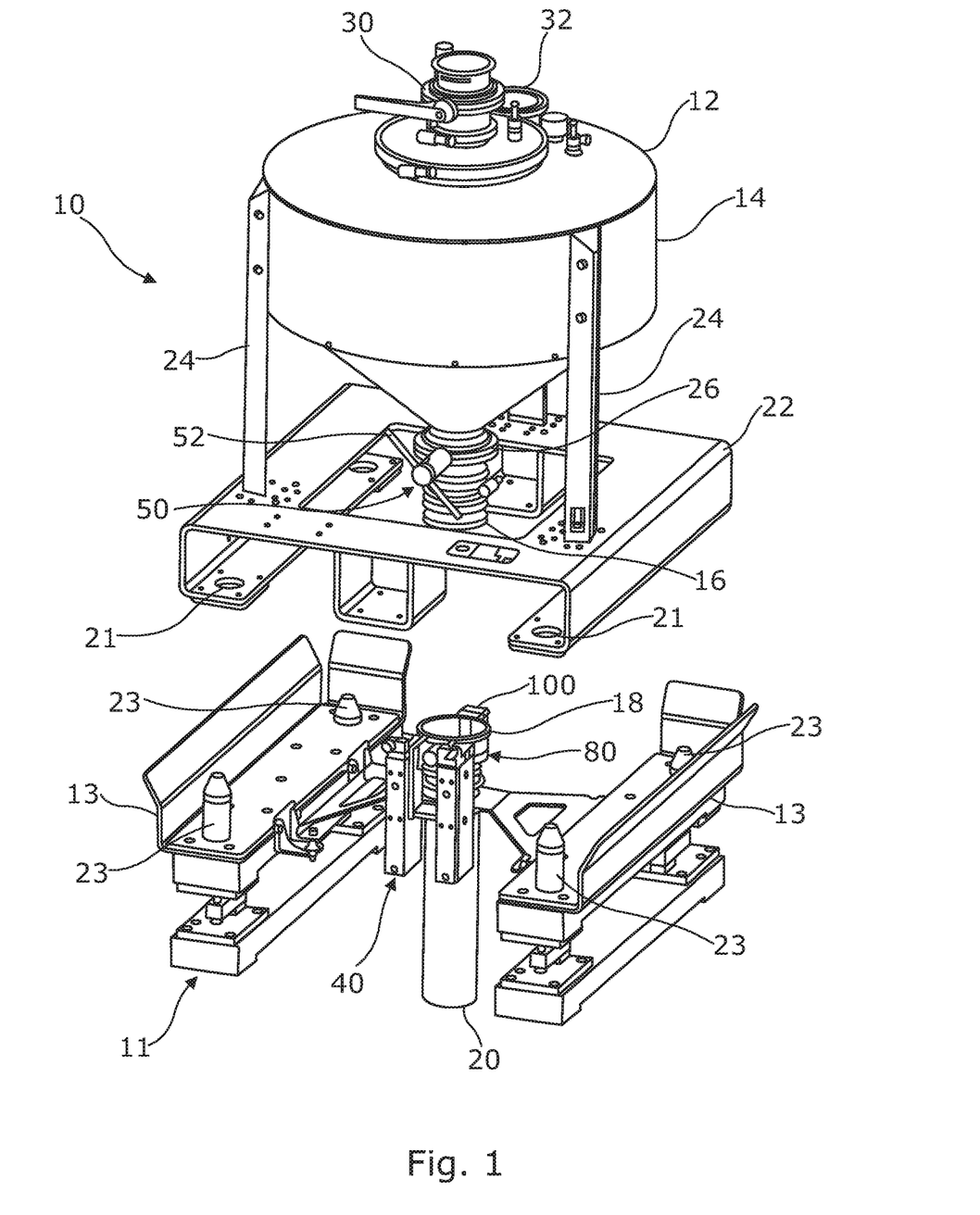
FIG. 1 is a perspective view of a docking arrangement.
Figure 2:
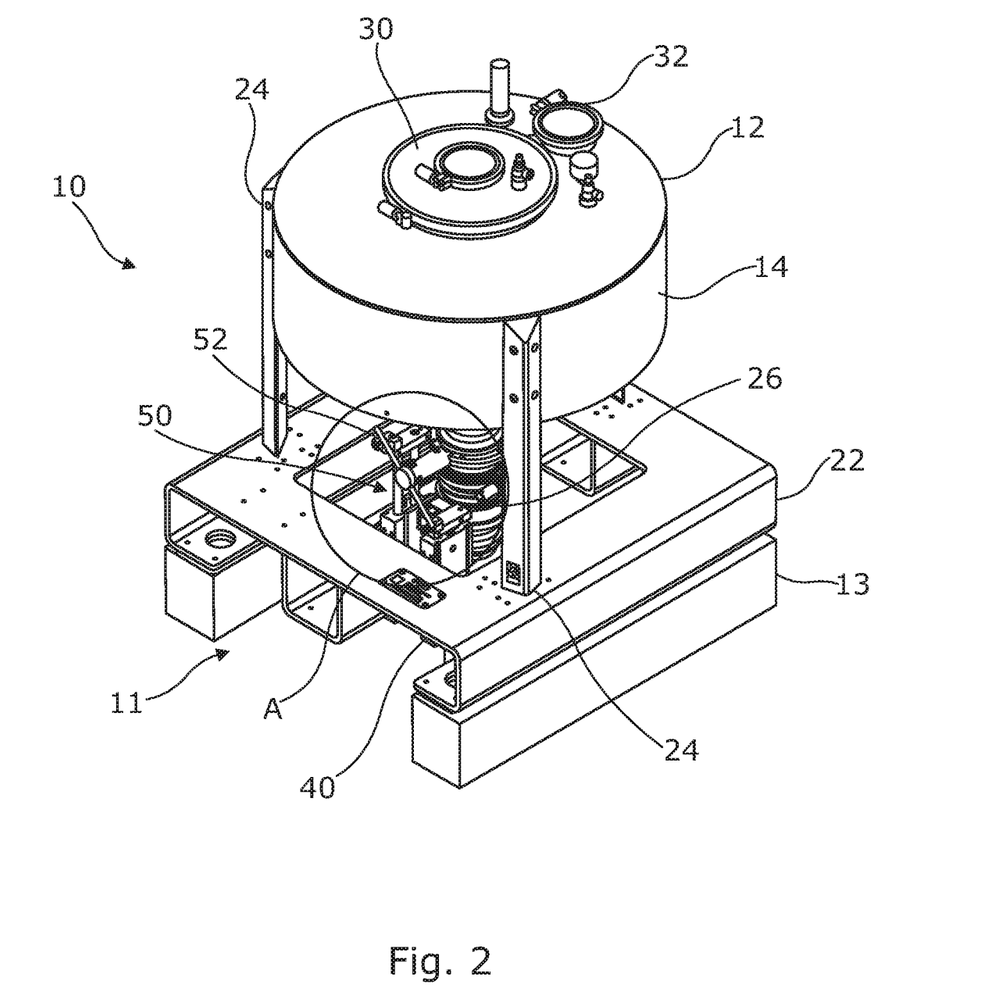
FIG. 2 is a perspective view of the docking arrangement of FIG. 1.

Referring to FIGS. 1 and 2, the docking arrangement 10 includes a dock 11 to which a container in the form of hopper 12 may be coupled. These Figures show the hopper 12 undocked from and docked to the dock 11, respectively. In use, the dock 11 may correspond to a machine of an additive manufacturing process and the hopper 12 may contain powder (such as metal powder) to be supplied to that machine.

The hopper 12 includes a stand 22 and supporting arms 24 for supporting a container 14 of the hopper 12 on the stand 22. In the illustrated embodiment, three supporting arms 24 are provided. The container 14 may include powder for the additive manufacturing process. The container comprises an upper cylindrical portion above a frustroconical portion, leading to an outlet 16.

The outlet 16 may be coupled and secured to an inlet 18 on the dock 11. The coupling between the outlet 16 of the hopper 12 and the inlet 18 includes a coupling system 80 and a locking mechanism 100. As is described in detail herein, the coupling system 80 and locking mechanism 100 facilitate coupling, locking and securing of the outlet 16 to the inlet 18 to allow material from the container 14 of the hopper 12 to be supplied to a further component of the manufacturing process via the dock 11. In the illustrated embodiment, the inlet 18 is provided with a conduit 20 for supplying the material from the hopper 12 to the further component of the manufacturing process.

The stand 22 of the hopper 12 includes apertures 21 in a base thereof for receiving corresponding projecting members 23 on the dock 11. As shown, the projecting members 23 project upwardly from a surface 13 of the dock 11. The coupling of the apertures 21 with respective projecting members 23 may act to further secure the hopper 12 to the dock 11, in use.

The illustrated hopper 12 is provided with a valve arrangement 26 for controlling flow of material out of the container 14 of the hopper 12. Preferably, the valve arrangement comprises an outlet valve in the form of a butterfly valve, however, it will be appreciated that the valve arrangement 26 can comprise any suitable valve type. The outlet valve is controlled via an operating handle 50. The operating handle 50 may be used to open and/or close the outlet valve of the valve arrangement 26 through rotation of a lever 52 of the operating handle 50, which may be effected in by an actuator 40 operatively coupled with the operating handle 50. Here, the actuator 40 forms part of the dock 11 and is positioned such that, upon docking of the hopper 12 on the dock 11, the operating handle 50 and actuator 40 are positioned relative to one another for subsequent actuation of the operating handle 50.

The illustrated hopper 12 is additionally provided with a gas inlet 32. In use, the gas inlet 32 34 may be used to control a pressure level inside the container 14 of the hopper 12. For example, it may be desirable to increase the pressure within the hopper 12 to aid flow of the material from the outlet 16.

As discussed herein, the docking arrangement 10 includes a dock 11 which may correspond (or form part of) to a machine of an additive manufacturing process (such as, for example, an additive manufacturing machine or a sieve) and the hopper 12 may contain powder to be supplied to that machine. However, in some instances it may be desirable for powder/material to be delivered to the hopper 12—e.g. to replenish the material therein. Accordingly, the hopper 12 is provided with an openable hatch 30 in an upper surface providing access to the interior of the container 14 of the hopper 12. In some instances, material from a further hopper may be deposited into the hopper 12. In such cases, the docking arrangement 10 may be used, where the inlet 18 (and optionally conduit 20) serve as an inlet to hopper 12 and a separate hopper is docked on the dock 11. This may be useful in embodiments where materials in two different hoppers may need to be blended, or simply for replenishing the material in hopper 12. In embodiments, material from one hopper or an additive manufacturing machine may be passed through a sieve before being deposited in the hopper 12. In such instances, the docking arrangement 10 may be adapted to receive a sieve.

Figure 3A:
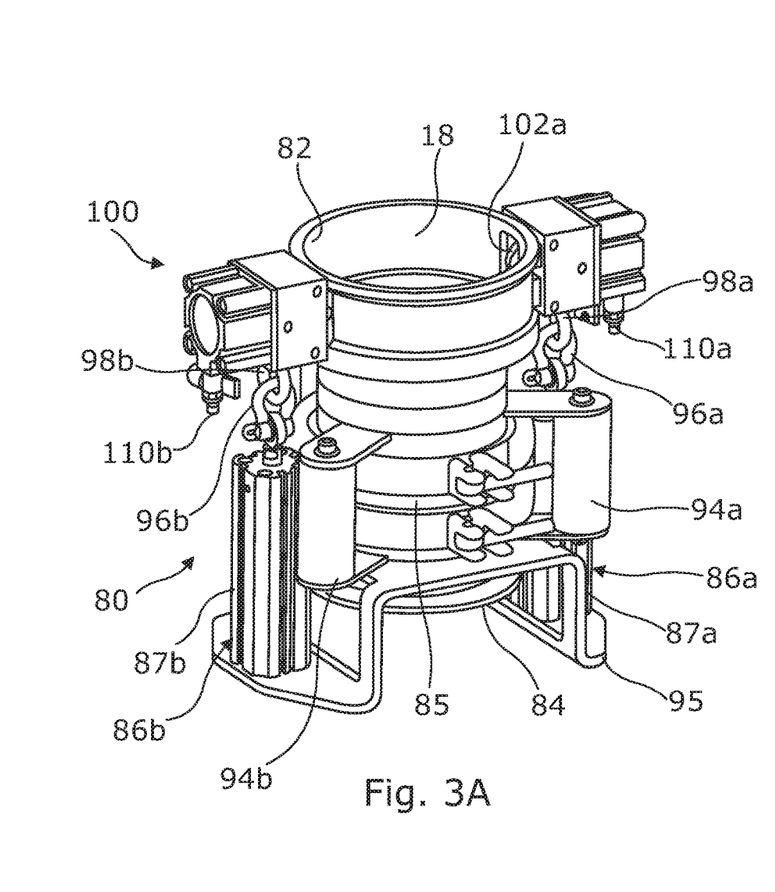
FIG. 3A is a perspective view of an embodiment of a coupling system.
Figure 3B:
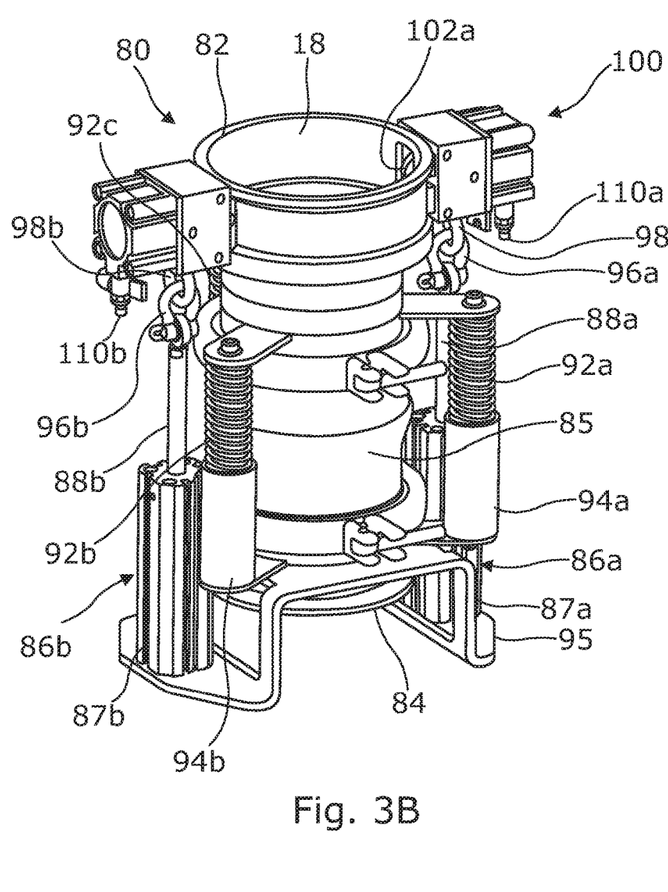
FIG. 3B is a further perspective view of the coupling system shown in FIG. 3A.

FIGS. 3A and 3B are perspective views of a coupling system 80 of the invention.

The coupling system 80 comprises a conduit which in use forms at least part of the pathway for the transfer of material between the hopper 12 and a further component of the additive manufacturing process. The conduit is formed of a first portion 82, second portion 84 and an intermediate portion 85 which is extendable between a fully extended and fully retracted position to increase or decrease the separation of the first and second portions 82, 84 thereby controlling the length of the conduit. The coupling system 80 additionally includes actuators in the form of a pair of pistons 86a, 86b operable, in use, to act on the conduit to control the extent to which the intermediate portion 85 is extended. In the illustrated embodiment, the pistons 86a, 86b are configured to act on the conduit to retract the intermediate portion 85 from a fully extended position corresponding to a rest state of the system 80. The intermediate portion 85 is formed of a flexible material which may collapse/fold on itself when retracted from the fully extended position.

Here, the conduit forms an inlet 18 for the further component of the additive manufacturing process with the conduit provided mounted on a frame 95. Specifically, the second portion 84 of the conduit is mounted to the frame 95, with the first portion 82 moveable with respect to the frame under the operation of the pistons 86a, 86b and/or springs 92a, 92b, 92c as discussed herein. The frame 95 may be mounted to the further component.

The pistons 86a, 86b include piston arms 88a, 88b which extend from respective piston housings 87a, 87b, in use. The piston housings 87a, 87b themselves are mounted to the frame 95, with the piston arms 88a, 88b coupled to the first portion 82 of the conduit via couplings 96a, 96b provided at the ends of the piston arms 88a, 88b and respective couplings 98a, 98b associated with the first portion 82. In the illustrated embodiment the couplings 96a, 96b and 98a, 98b comprise ring couplings which, in use, allow for minor relative movement of the first portion 82 with respect to the piston arms 88a, 88b without requiring operation of the pistons 86a, 86b themselves.

The coupling system 80 additionally includes a plurality of biasing members in the form of springs 92a, 92b, 92c. The springs 92a, 92b are connected at a first end to the first portion 82 of the conduit, and at a second end to the second portion 84 of the conduit. In use, the springs 92a, 92b, 92c are operable to provide a biasing force between the first and second portions 82, 84 of the conduit. Specifically, the springs 92a, 92b, 92c are operable to provide a biasing force which acts in the direction of the fully extended position of the intermediate portion 85—i.e. with the extension of the intermediate portion 85 or against retraction of the intermediate portion 85. The coupling system 80 additionally includes spring housings 94a, 94b, 94c into which respective springs 92a, 92b, 92c may be compressed with the intermediate portion 85 in a fully retracted state and extend from with the intermediate portion 85 moving to an extended state.

FIGS. 3A and 3B illustrate the operational use of the coupling system 80. Specifically, FIG. 3A shows the intermediate portion 85 in a first, retracted state and FIG. 3B shows the intermediate portion 85 in a second, extended state. As shown, through extending or retracting the intermediate portion 85, the overall length of the conduit can be controlled.

Starting from the arrangement shown in FIG. 3A, with the intermediate portion 85 in the retracted state, the piston arms 88a, 88b of pistons 86a, 86b may be extended from respective piston housings 87a, 87b. In the illustrated embodiment, the piston arms 88a, 88b are operable to extend upwardly enabling extension of the intermediate portion 85 in a generally upwards direction.

Extension of the piston arms 88a, 88b removes or at least reduces the compression being applied to the springs 92a, 92b, 92c by the pistons 86a, 86b thereby allowing for the first portion 82 of the conduit to be moved in a generally upwards direction (with respect to the second portion 84 of the conduit) under the influence of the biasing force provided by the springs 92a, 92b, 92c. This movement for the most part is constrained by the piston arms 88a, 88b and in particular by the ring couplings 96a, 96b, 98a, 98b. With the piston arms 88a, 88b in a fully extended position, the ring couplings 96a, 96b, 98a, 98b may disengage or become slack such that the piston arms 88a, 88b no longer act on the first portion 82 of the conduit. Instead, the first portion 82 is held in this position by means of the biasing force provided by the springs 92a, 92b, 92c. In this way, the piston arms 88a, 88b provide no force/weight transfer to the conduit when the intermediate portion 85 is extended which, as described herein may be advantageous in terms of monitoring the weight of the hopper 12 and/or absorbing forces within the conduit or springs 92a, 92b, 92c which may otherwise be transferred to other components.

The reverse process may be followed to retract the intermediate portion 85 and thereby reduce the length of the conduit. Specifically, withdrawal of the piston arms 88a, 88b into respective piston housings 87a, 87b first reengages the ring couplings 96a, 96b, 98a, 98b before effectively pulling the first portion 82 of the conduit back towards the second portion 84 against the biasing force provided by springs 92a, 92b, 92c. In doing so, the intermediate portion 85 is retracted and the overall length of the conduit is consequently reduced.

Figure 4A:
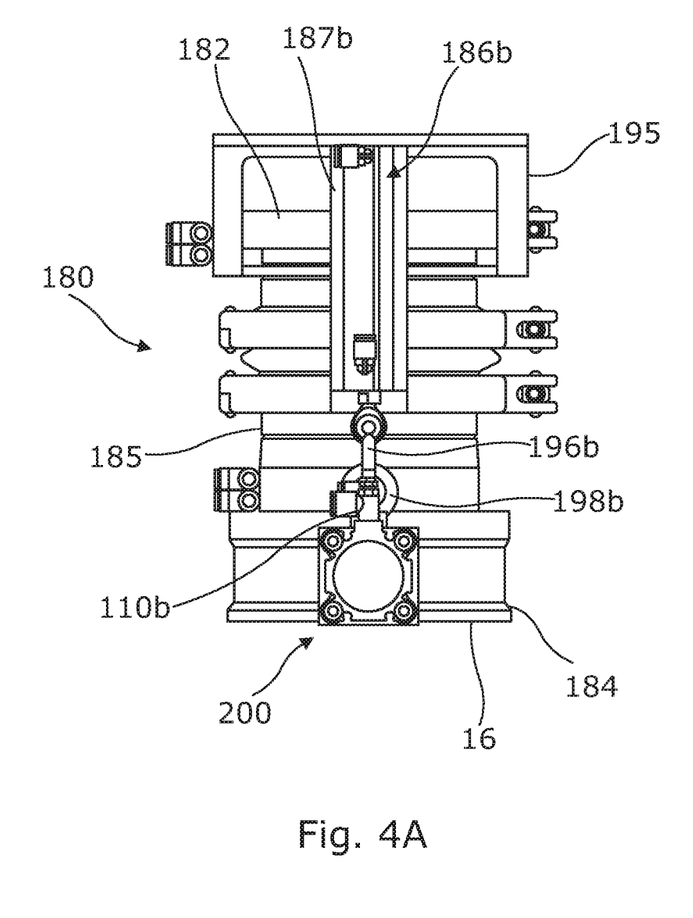
FIG. 4A is a side view of a further embodiment of a coupling system.
Figure 4B:
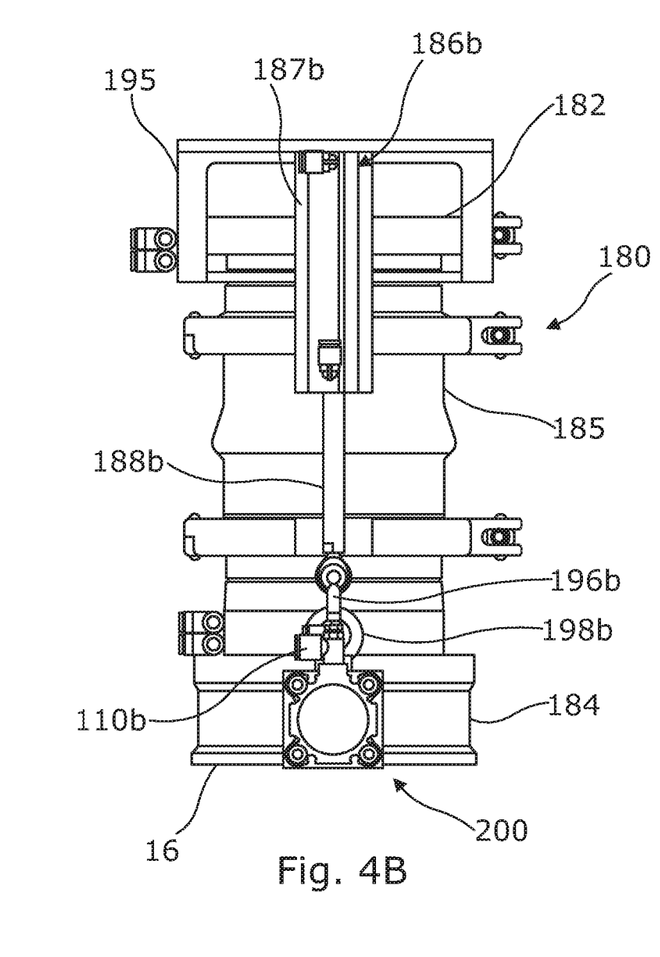
FIG. 4B is a further side view of the coupling system shown in FIG. 4A.
Figure 5:
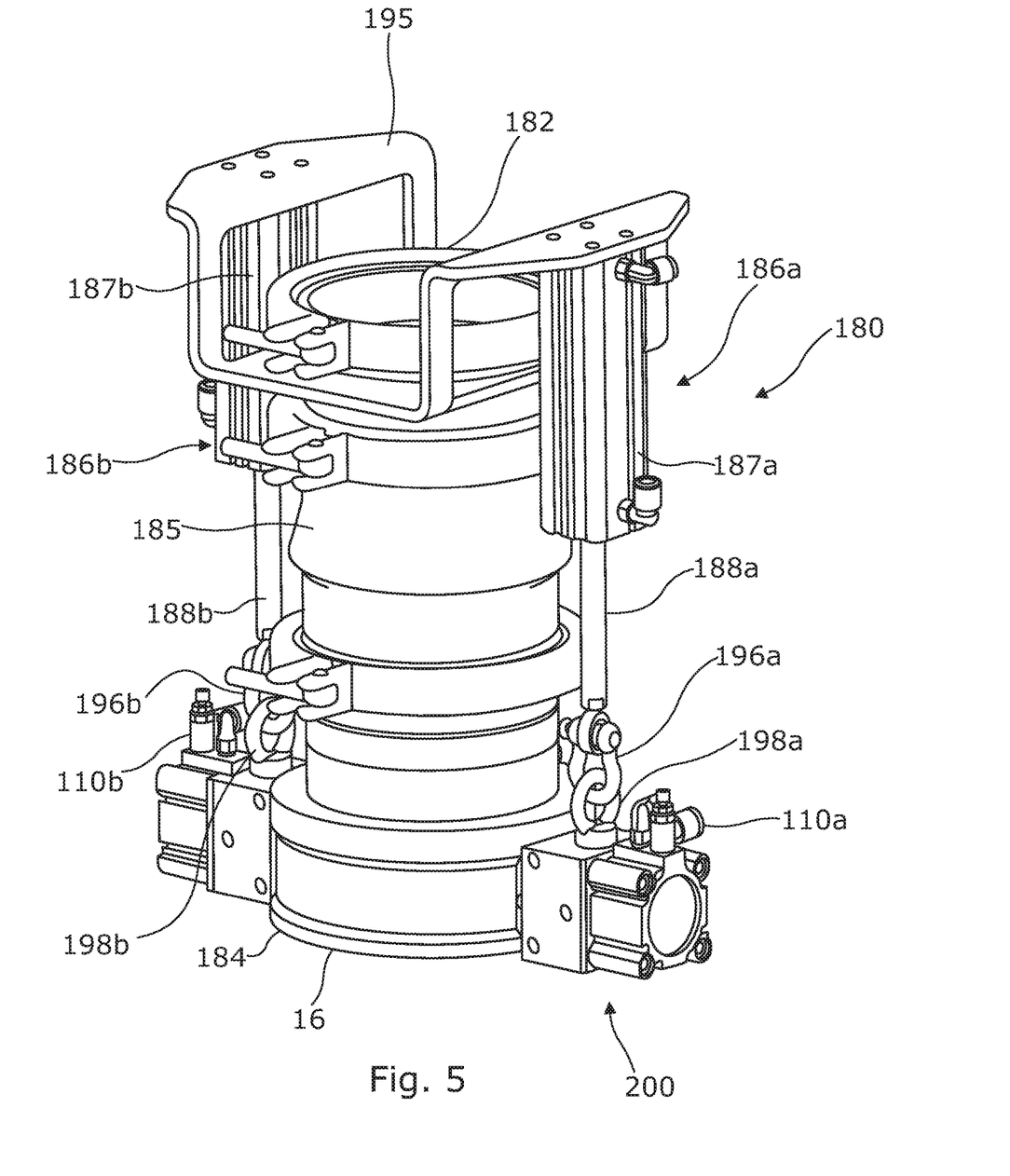
FIG. 5 is a perspective view of the coupling system shown in FIGS. 4A and 4B.

FIGS. 4A, 4B and 5 illustrate an alternative embodiment of a coupling system 180 of the invention. Like reference numerals have been used to illustrate components common to both coupling system 180 and coupling system 80.

The coupling system 180 comprises a conduit which in use forms at least part of the pathway for the transfer of material between the hopper 12 and a further component of the additive manufacturing process. The conduit is formed of a first portion 182, second portion 184 and an intermediate portion 185 which is extendable between a fully extended and fully retracted position to increase or decrease the separation of the first and second portions 182, 184 thereby controlling the length of the conduit. As with coupling system 80, the coupling system 180 additionally includes actuators in the form of a pair of pistons 186a, 186b operable, in use, to act on the conduit to control the extent to which the intermediate portion 185 may extend. In the illustrated embodiment, the pistons 186a, 186b are configured to act on the conduit to retract the intermediate portion 185 from a fully extended position (FIG. 4B) corresponding to a rest state of the system 180. The intermediate portion 185 is formed of a flexible material which may collapse/fold on itself when retracted from the fully extended position.

Here, the conduit forms an outlet 16 for the hopper 12 with the conduit provided mounted on a frame 195. Specifically, the first portion 182 of the conduit is mounted to the frame 195, with the second portion 184 moveable with respect to the frame under the operation of the pistons 186a, 186b and/or under gravity as discussed herein. The frame 195 may be mounted to the hopper 12.

The pistons 186a, 186b are configured in the same way as pistons 86a, 86b, including piston arms 188a, 188b which extend from respective piston housings 187a, 187b, in use. The piston housings 187a, 817b themselves are mounted to the frame 195, with the piston arms 188a, 188b coupled to the second portion 184 of the conduit via couplings 196a, 196b provided at the ends of the piston arms 188a, 188b and respective couplings 198a, 198b associated with the second portion 184. Again, the couplings 196a, 196b and 198a, 198b comprise ring couplings which, in use, allow for minor relative movement of the second portion 184 with respect to the piston arms 188a, 188b without requiring operation of the pistons 186a, 186b themselves.

FIGS. 4A and 4B illustrate the operational use of the coupling system 180. Specifically, FIG. 4A shows the intermediate portion 185 in a first, retracted state and FIG. 4B shows the intermediate portion 185 in a second, extended state. As shown, through extending or retracting the intermediate portion 185, the overall length of the conduit can be controlled.

Starting from the arrangement shown in FIG. 4A, with the intermediate portion 185 in the retracted state, the piston arms 188a, 188b of pistons 186a, 186b may be extended from respective piston housings 187a, 187b. In the illustrated embodiment, the piston arms 188a, 188b are operable to extend downwardly enabling extension of the intermediate portion 185 in a generally downwards direction.

Extension of the piston arms 188a, 188b removes or at least reduces any restraint provided by the pistons 186a, 186b thereby allowing for the second portion 184 of the conduit to move in a generally downwards direction (with respect to the first portion 182 of the conduit) under gravity. This movement for the most part is constrained by the piston arms 188a, 188b and in particular by the ring couplings 196a, 196b, 198a, 198b. With the piston arms 188a, 188b in a fully extended position, the ring couplings 196a, 196b, 198a, 198b may disengage or become slack such that the piston arms 188a, 188b no longer act on the second portion 184 of the conduit. Instead, the second portion 184 is held in this position by means of the resiliency of intermediate portion 185 itself. In this way, the piston arms 188a, 188b provide no force/weight transfer to the conduit when the intermediate portion 185 is extended which, as described herein may be advantageous in terms of monitoring the weight of the hopper 12 and/or absorbing forces within the conduit which may otherwise be transferred to other components of the manufacturing process.

The reverse process may be followed to retract the intermediate portion 185 and thereby reduce the length of the conduit. Specifically, withdrawal of the piston arms 188a, 188b into respective piston housings 187a, 187b first reengages the ring couplings 196a, 196b, 198a, 198b before effectively pulling the second portion 184 of the conduit back upwards towards the first portion 182. In doing so, the intermediate portion 185 is retracted and the overall length of the conduit is consequently reduced.

FIGS. 6A-7B illustrate a first locking mechanism 100 which may form part of, or be used in conjunction with the coupling system 80. The locking mechanism 100 is configured to secure an outlet 16 of the hopper 12 to an inlet 18 of a further component of an additive manufacturing process, such as an additive manufacturing machine. Specifically, the locking mechanism 100 is provided with the inlet 18 and is positioned such that it may act on an external surface of the outlet 16 when the outlet 16 is received within an open upper end of the inlet 18.

The locking mechanism 100 includes a pair of opposing locking members in the form of rollers 102a, 102b which are moveable in a direction perpendicular to their rotation axis. In the orientation shown in the Figures, this comprises movement in a horizontal direction. Movement of the rollers 102a, 102b is controlled via respective linear actuators in the form of pistons 104a, 104b. The rollers 102a, 102b are mounted to respective pistons 104a, 104b via respective clevis-type fasteners 106a, 106b which allow rotational movement of the rollers 102a, 102b about respective rotation axes. Alternatively the rollers may include an outer collar which is rotationally mounted, for example by way of needle roller bearings, to the remainder of the roller.

Figure 6A:
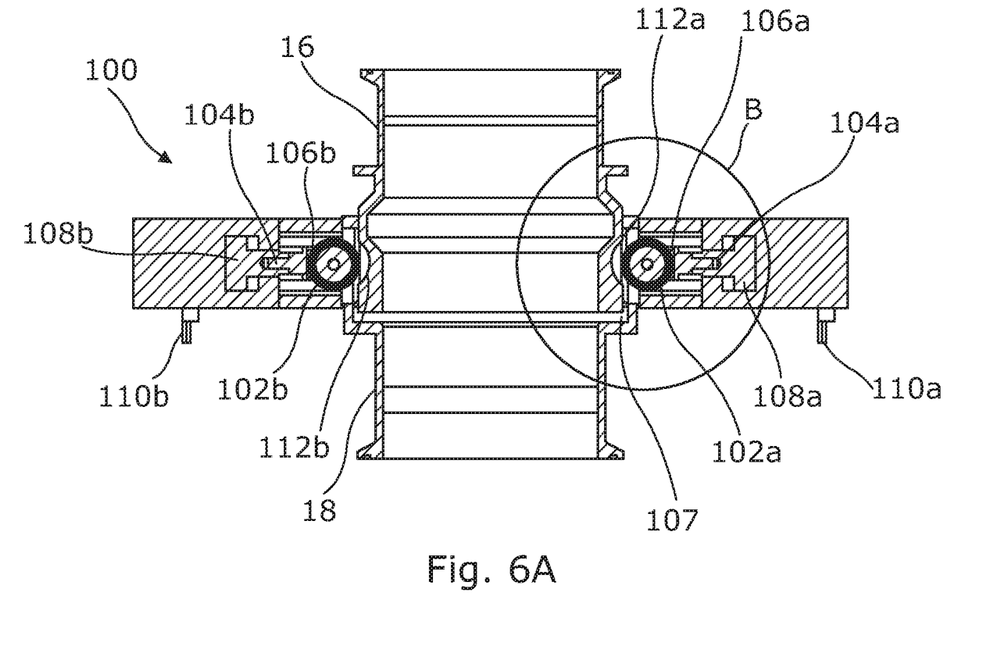
FIG. 6A is a cross-sectional view of a locking mechanism in a first state.
Figure 6B:
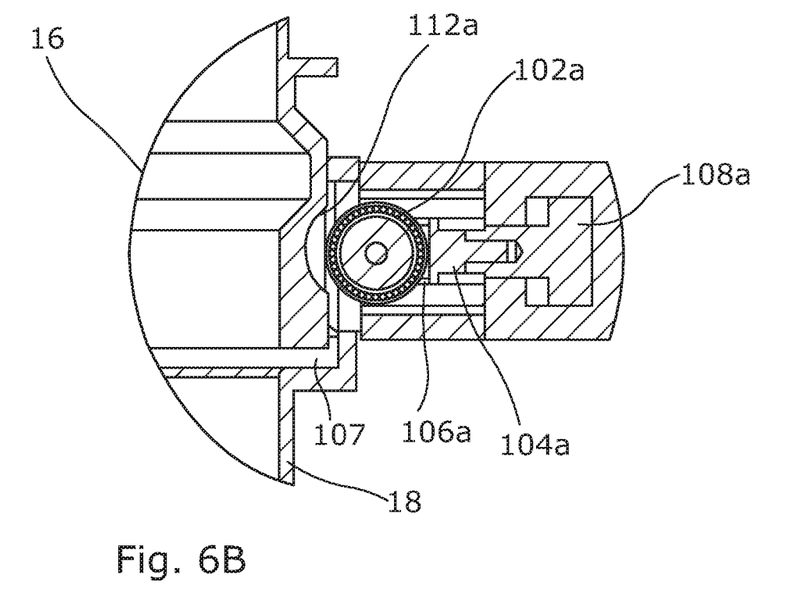
FIG. 6B is an enlargement of region B of FIG. 6A.
Figure 7A:
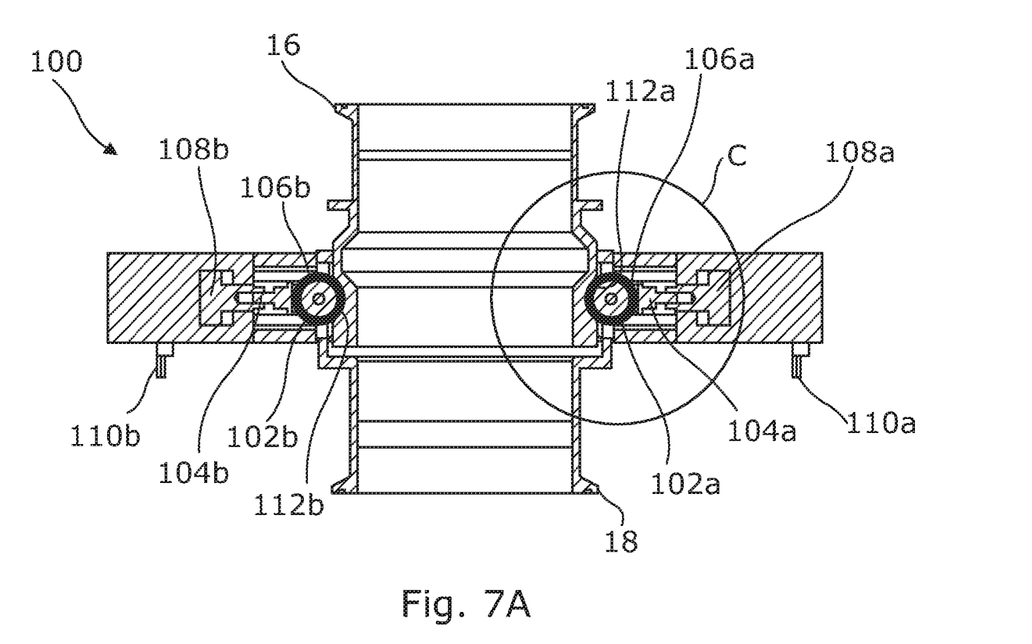
FIG. 7A corresponds to FIG. 6A with the locking mechanism in a second state.
Figure 7B:
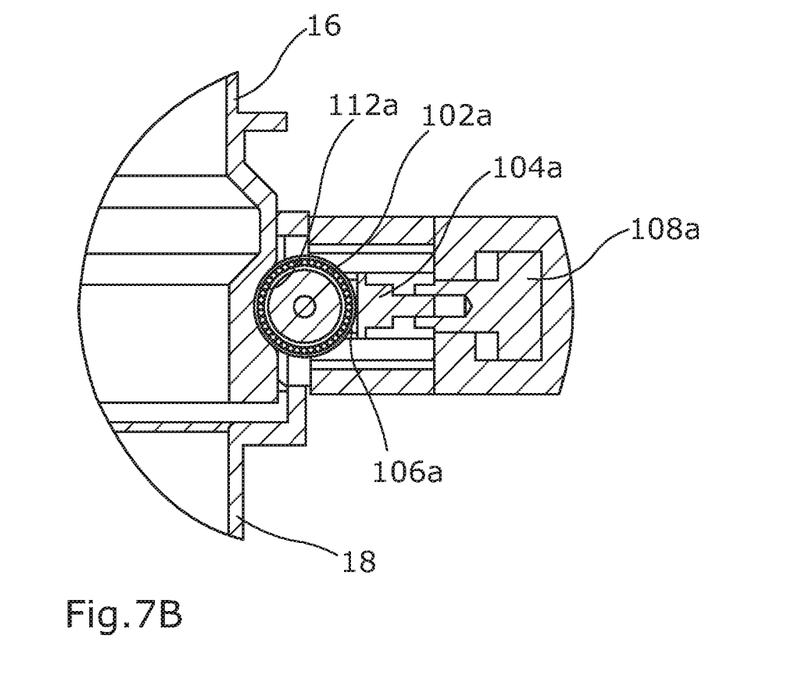
FIG. 7B is an enlargement of region C of FIG. 7A.

In use, the pistons 104a, 104b are configured to control movement of the respective rollers 102a, 102b between a first longitudinal position (as shown in FIGS. 6A and 6B) and a second longitudinal position (as shown in FIGS. 7A and 7B). Here, the first longitudinal position of the rollers 102a, 102b corresponds to an "unlocked" state of the locking mechanism 100 and the second longitudinal position corresponds to a "locked" state of the locking mechanism 100.

In alternative embodiments the rollers are mounted on an actuator other than a piston and cylinder device. The may be an electrical actuator, such as a solenoid.

The outlet 16 of the hopper 12 is provided with a groove 112 about an exterior surface thereof, depicted here by opposing groove sections 112a, 112b. The groove sections 112a, 112b correspond to respective rollers 102a, 102b. The groove 112 may be provided about the entire circumference of the outlet 16. This may allow the hopper 12 to be secured within the docking arrangement 10 without requiring the hopper 12 to be positioned with the groove 112 precisely aligned with respective rollers 102a, 102b.

In use, the groove sections 112a, 112b are configured to receive at least part of respective rollers 102a, 102b to secure the outlet 16 of the hopper 12 to the inlet 18. Specifically, the process of coupling and securing the outlet 16 and inlet 18 begins with the rollers 102a, 102b provided in the first longitudinal position. With the rollers 102a, 102b in the first longitudinal position, the outlet 16 of the hopper 12 is able to be brought proximal and preferably into contact with the inlet 18. Here, the outlet 16 is positioned within a recess 107 within the open end of the inlet 18 as shown in FIGS. 6A and 6B. With the outlet 16 in this position, the rollers 102a, 102b are moved to the second longitudinal position (as shown in FIGS. 7A and 7B) under the operation of respective pistons 104a, 104b. When in the second longitudinal position the rollers 102a, 102b are at least partly received in the groove 112, specifically in corresponding groove sections 112a, 112b in the exterior wall of the outlet 16 preventing the outlet 16 from being withdrawn from the recess 107 in the inlet 18. In this way, the locking mechanism 100 may be used to couple and secure the outlet 16 to the inlet 18.

Pistons 104a, 104b are controlled pneumatically through the introduction and/or removal of gas from within respective piston chambers 108a, 108b. The gas is supplied and/or removed from piston chambers 108a, 108b via respective supply pipes 110a, 110b. As will be appreciated, introduction of gas into the piston chambers 108a, 108b will cause the pistons to move inwardly (in the configuration shown in the Figures) and hence cause the rollers 102a, 102b to move to the second longitudinal position. Removal of gas from within the piston chambers 108a, 108b will cause the pistons to move outwardly (in the configuration shown in the Figures) and hence cause the rollers 102a, 102b to move to the first longitudinal position.

Locking and unlocking of the locking mechanism 100 may preferably be controlled centrally via a control system (not shown). The central control system may also take into account other operational states of components of the docking arrangement 10 in controlling operation of the locking mechanism 100. For example, the central control system may require that the outlet valve of the valve arrangement 26 be in a closed state before allowing/controlling the locking mechanism 100 to unlock. Equally, the central control system may be configured to prevent opening of the outlet valve of the valve arrangement 26 unless the locking mechanism 100 is locked with the outlet 16 and inlet 18 coupled and secured in position.

Figure 8:
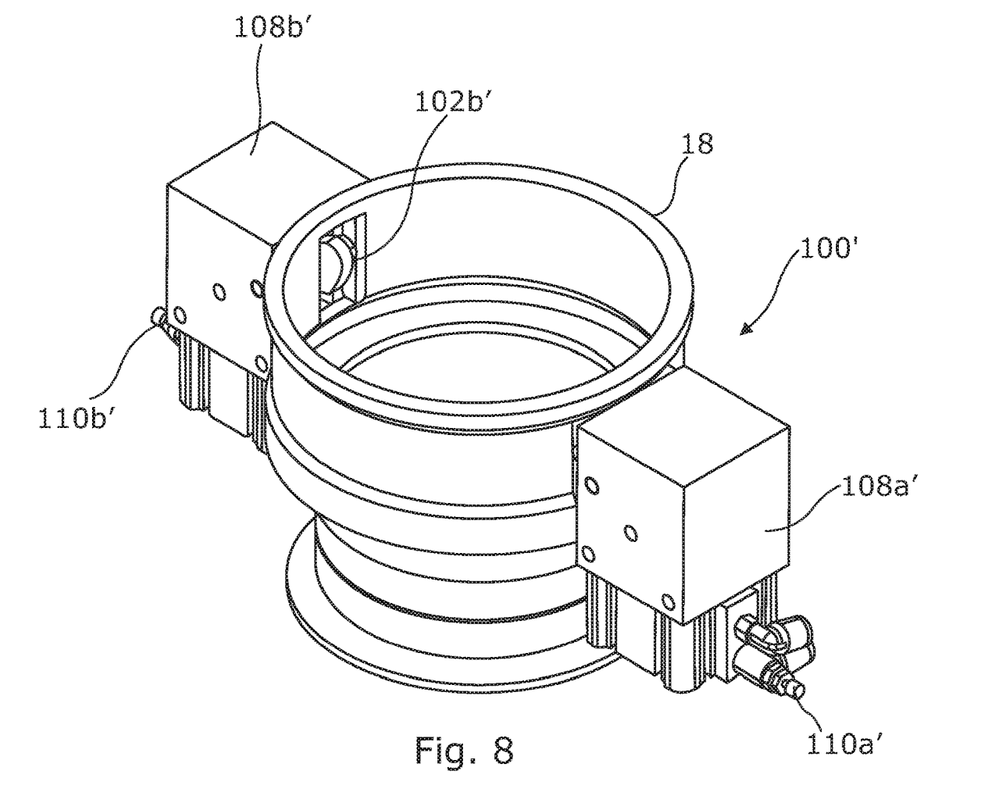
FIG. 8 is a perspective view of an alternative locking mechanism.
Figure 9:
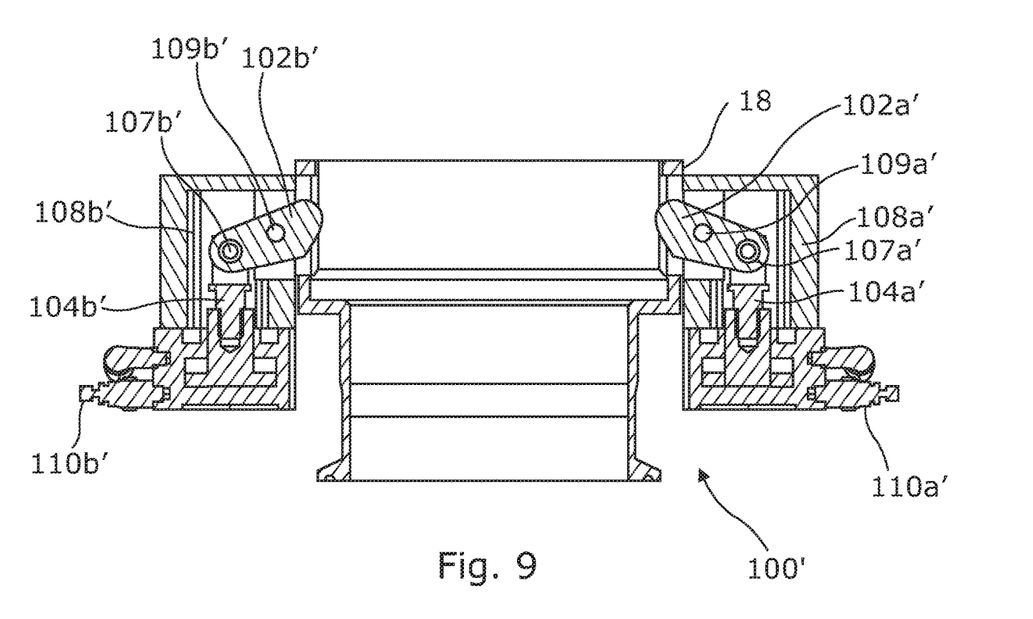
FIG. 9 is a cross-sectional view of the locking mechanism of FIG. 8.

An alternative locking mechanism 100' is shown in FIGS. 8 and 9.

The locking mechanism 100' includes a pair of locking members in the form of cams 102a', 102b', rotatably mounted at respective primary pivot points 109a', 109b'. In use, rotation of the cams 102a', 102b' about the respective primary pivot points 109a', 109b' causes the cams 102a', 102b' to move into and out of the interior of inlet 18 to between locked and unlocked positions to engage and disengage with the outlet 16 of the hopper 12 in a similar fashion to rollers 102a, 102b shown in the preceding Figures.

The cams 102a', 102b' are additionally rotatably mounted at ends thereof to respective linear actuators in the form of pistons 104a', 104b' via secondary pivot points 107a', 107b'. In use, movement of the cams 102a', 102b' is controlled via the pistons 104a', 104b' as described herein. Specifically, the pistons 104a', 104b' are configured to control movement of the respective cams 102a', 102b' between a first rotational position corresponding to an "unlocked" state of the locking mechanism 100' and a second rotational position corresponding to a "locked" state of the locking mechanism 100'. In the unlocked state, the cams 102a', 102b' are positioned substantially out of the interior of the inlet 18 (as shown in FIG. 9). In the locked state, the cams 102a', 102b' project into the interior of the inlet 18 to engage an exterior surface (e.g. a groove 112) of a corresponding outlet 16 of a hopper 12 as discussed above.

As will be appreciated, pistons 104a', 104b' may be controlled pneumatically through the introduction and/or removal of gas from within respective piston chambers 108a', 108'b. The gas is supplied and/or removed from piston chambers 108a', 108b' via respective supply pipes 110a', 110b'.

Introduction of gas into the piston chambers 108a', 108b' causes the pistons to move upwardly (in the configuration shown in the Figures) and hence cause the cams 102a', 102b' to rotate about respective primary pivot points 109a', 109b' from a first rotational position to a second rotational position. Conversely, removal of gas from within the piston chambers 108a', 108b' will cause the pistons 108a', 108b' to move downwardly (in the configuration shown in the Figures) and hence cause the cams 102a', 102b' to rotate about respective primary pivot points 109a', 109b' in the opposite sense from a second rotational position to a first rotational position.

Here, cams 102a', 102b' are "over-centre" cams. Rotation of the cams 102a', 102b' about respective primary pivot points 109a', 109b' past the horizontal—i.e. past where the primary pivot points 109a', 109b' are horizontally aligned with respective secondary pivot points 107a', 107b'—effectively locks the cams 102a', 102b' in place when in respective second rotational positions unless otherwise acted on by respective pistons 104a', 104b'. Specifically, this prevents any internal force/pressure on the cams 102a', 102b', e.g. by the outlet 16 of the hopper 12 from unintentionally "unlocking" the locking mechanism 100', in use.

As with locking mechanism 100, locking and unlocking of the locking mechanism 100' may preferably be controlled centrally via a control system (not shown). Again, the central control system may also take into account other operational states of components of the docking arrangement 10 in controlling operation of the locking mechanism 100₍.

An alternative locking mechanism 200 may form part of, or be used in conjunction with the coupling system 180. The locking mechanism 200 may be configured in the same way as either locking mechanism 100 or locking mechanism 100₍ for securing an outlet 16 of the hopper 12 to an inlet 18 of a further component of an additive manufacturing process, such as an additive manufacturing machine. Locking mechanism 200 may differ only in that the locking mechanism 200 is provided with the outlet 16 of the hopper 12 and is positioned such that it may act on an external surface of the inlet 18 of the further component of the additive manufacturing process when the inlet 18 is received within an open lower end of the outlet 16.

The one or more embodiments are described above by way of example only. Many variations are possible without departing from the scope of protection afforded by the appended claims.

The invention claimed is:

1. A coupling system for an additive manufacturing process, comprising:
   a conduit for the transfer of material between a container and a further component of the additive manufacturing process; and
   one or more actuators for controlling operation of the conduit;
   wherein the conduit comprises first and second portions connected via an extendable intermediate portion;
   wherein the one or more actuators are operable to act on at least a portion of the conduit to extend or retract the intermediate portion to control the length of the conduit; and
   wherein the coupling system comprises ring couplings which disengage or become slack when the or each actuator is fully extended so the or each actuator does not act on the first portion of the conduit.

2. A coupling system as claimed in claim 1, wherein the intermediate portion comprises a flexible material.

3. A coupling system as claimed in claim 1, wherein the conduit comprises an outlet of the container.

4. A coupling system as claimed in claim 3, wherein the first portion of the conduit is fixedly connected to or integrally formed with the container, with the second portion of the conduit comprising an interface for coupling the outlet of the container to the inlet for the further component of the additive manufacturing process.

5. A coupling system as claimed in claim 3, wherein the conduit is configured to extend substantially downwards under gravity and is operable to be retracted under operation of the one or more actuators.

6. A coupling system as claimed in claim 1, wherein the conduit comprises an inlet for the further component of the additive manufacturing process.

7. A coupling system as claimed in claim 6, wherein the first portion of the conduit is fixedly connected to or integrally formed with the further component with the second portion of the conduit comprising an interface for coupling the inlet for the further component to the outlet of the container.

8. A coupling system as claimed in claim 6, wherein the conduit is configured to extend substantially upwards and is operable to be retracted under operation of the one or more actuators.

9. A coupling system as claimed in claim 1 comprising one or more biasing members.

10. A coupling system as claimed in claim 9, wherein the one or more biasing members are configured to provide a bias which, in use, acts with the extension of the intermediate portion.

11. A coupling system as claimed in claim 10, wherein the one or more actuators are operable to control the length of the conduit by restricting the extent to which the intermediate portion may be extended under operation of the one or more biasing members.

12. A coupling system as claimed in claim 9, wherein the one or more biasing members are configured to provide a bias which, in use, acts against extension of the intermediate portion.

13. A coupling system as claimed in claim 1, wherein the one or more actuators are coupled to a portion of the conduit via one or more connectors.

14. A coupling system as claimed in claim 13, wherein the one or more connectors are configured such that the portion of the conduit is able to move with respect to the one or more actuators.

15. A coupling system as claimed in claim 1, comprising a locking mechanism configured, in use, to hold the outlet of the container and the inlet for the component of the additive manufacturing process in a coupled state.

16. A coupling system as claimed in claim 15, wherein the locking mechanism includes one or more locking members, moveable in use between at least a first position and a second position under the operation of one or more locking actuators.

17. A container for an additive manufacturing process, the container comprising an outlet for dispensing material held within the container to a further component of the additive manufacturing process, and wherein the outlet comprises the coupling system of claim 1.

18. A component forming part of an additive manufacturing process, the component comprising an inlet, and wherein the inlet comprises the coupling system of claim 1.

19. A docking arrangement for an additive manufacturing process, the docking arrangement comprising: a dock associated with an inlet for a component of the additive manufacturing process; a container comprising an outlet; and the coupling system of claim 1 for coupling the outlet of the container to the inlet for the component of the additive manufacturing process.

20. A method of coupling an outlet of a container to an inlet for a further component of an additive manufacturing process using the coupling system of claim 1, the method comprising:
    positioning the outlet of the container and the inlet for the further component proximal to one another;
    using one or more actuators of the coupling system to control the length of the conduit to bring the outlet and inlet into a coupling position; and
    coupling the outlet to the inlet.

21. A method of claim 20, comprising using one or more locking members to retain the coupling between the outlet of the container and the inlet for the component of the additive manufacturing process.

* * * * *